United States Patent [19]
Takanashi et al.

[11] Patent Number: 5,095,201
[45] Date of Patent: Mar. 10, 1992

[54] PHOTO-MODULATION METHOD AND SYSTEM FOR REPRODUCING CHARGE LATENT IMAGE

[75] Inventors: Itsuo Takanashi, Kamakura; Shintaro Nakagaki, Fujisawa; Tsutou Asakura, Yokohama; Masato Furuya, Yokosuka; Hirohiko Shinonaga, Yokohama; Tetsuji Suzuki, Yokosuka, all of Japan

[73] Assignee: Victor Company of Japan, Ltd., Yokohama, Japan

[21] Appl. No.: 457,367

[22] Filed: Dec. 27, 1989

[30] Foreign Application Priority Data

Dec. 28, 1988 [JP] Japan .................. 63-334939

[51] Int. Cl.$^5$ .............................. H01J 40/14
[52] U.S. Cl. .................. 250/213 R; 358/300; 365/112
[58] Field of Search .............. 250/213 R, 214 P; 313/391, 392, 366; 365/120, 127, 106, 112; 358/75

[56] References Cited

U.S. PATENT DOCUMENTS

| | | | |
|---|---|---|---|
| 3,786,441 | 1/1974 | Engeler et al. | 313/392 |
| 4,095,280 | 6/1978 | Okumura | 365/112 |
| 4,191,454 | 3/1980 | Braatz et al. | 350/342 |
| 4,818,857 | 4/1989 | Micheron et al. | 250/213 R |
| 5,003,402 | 3/1991 | Takanashi et al. | 358/75 |

FOREIGN PATENT DOCUMENTS

63077  10/1982  European Pat. Off. .

Primary Examiner—David C. Nelms
Assistant Examiner—Que T. Le
Attorney, Agent, or Firm—Michael N. Meller

[57] ABSTRACT

There are provided a method of modulating a photo-modulation layer correspondingly with an electric field applied thereto by applying an alternating electric field to a semiconductor layer disposed adjacent to the photo-modulation layer to vary a thickness of a depletion layer thereof responsive to the alternating electric field and applying the electric field to the photo-modulation layer while the alternating electric field is applied to the semiconductor layer and varying the thickness of the depletion layer, and a system for reproducing a charge latent image recorded in a recording medium which has at least a charge hold layer holding the charge latent image comprising a photo-modulation layer disposed adjacent to the recording medium so as to be subjected to an electric field generated by the charge latent image held on the charge hold layer, a semiconductor layer disposed adjacent to the photo-modulation layer, the semiconductor layer having a depletion layer which has a capacitance variable in response to an applied varying electric field, means for applying the varying electric field to the semiconductor layer for varying the capacitance of the depletion layer thus subjecting the electric field generated by the charge latent image being applied to the photo-modulation layer and means for projecting a reading light passing through the photo-modulation layer and for detecting modulation of the reading light passed therethrough.

8 Claims, 6 Drawing Sheets

PHOTO-MODULATION METHOD AND SYSTEM FOR REPRODUCING CHARGE LATENT IMAGE

BACKGROUND OF THE INVENTION

This invention relates to a photo-modulation method and a system for reproducing a charge latent image.

In compliance with an increased demand for a reproduced image with high picture quality and high resolution in recent years, as well known, various systems such as so-called EDTV (Extended Definition TV) system, or HDTV (High Definition TV) system have been proposed also for a television system. In order to obtain a reproduced image with high picture quality and high resolution, it is required to provide an image pickup device capable of producing a video signal from which a high picture quality and high resolution image can be recreated. However, for conventional image pickup devices using an image pickup tube, it is difficult to generate such a video signal. The reasons for this are as follows: Since there is a limit to the reduction of the diameter of an electron beam in the pickup tube, high resolution image reproduction by reduction of the diameter of the electron beam cannot be expected. Alternatively, if the target area of the pickup tube is increased, the level of the output signal will be reduced because of the increased output capacity which is proportional to the area of the target. Therefore, high resolution image reproduction by the increase of the target area cannot be realistic. Furthermore, in the case of an image pickup device for a moving picture, since the frequency range of such a video signal reaches several tens to several hundreds MHz for implementation of the high resolution image, the increase of output capacity i.e. the increase of target area is not preferable.

On the other hand, an increase of pixels or downsizing a pixel of solid state image sensors has difficulties known to the industry.

As stated above, conventional image pickup devices of either a pickup tube or a solid state sensor could not satisfactorily generate such a video signal to provide a reproduced image of high picture quality and high resolution because of the inevitable use of an image sensor for the construction thereof. In order to solve this, the assignee of this application has already proposed an imaging system and a recording system to obtain a high resolution optical image by an image pickup device using a photo-to-photo transducer, and to record such an optical image as a charge image of high resolution onto a charge accumulation layer (or a charge hold layer) by using a photo-to-charge transducer.

Naturally, in the implementation of such imaging system and recording system proposed by the assignee of this application, a comparably capable read out system is required which reproduces such a charge image recorded on a recording medium as an electric signal. However, no satisfactory reproducing apparatus therefor has been available to date.

SUMMARY OF THE INVENTION

A primary object of this invention is to provide a method of modulating a photo-modulation layer correspondingly with an electric field applied thereto to applying an alternating electric field to a semiconductor layer disposed adjacent to the photo-modulation layer to vary a thickness of a depletion layer thereof responsive to the alternating electric field and applying the electric field to the photo-modulation layer while the alternating electric field is applied to the semiconductor layer and varying the thickness of the depletion layer.

Furthermore, a secondary object of this invention is to provide a system for reproducing a charge latent image recorded in a recording medium which has at least a charge hold layer holding the charge latent image comprising a photo-modulation layer disposed adjacent to the recording medium so as to be subjected to an electric field generated by the charge latent image held on the charge hold layer, a semiconductor layer disposed adjacent to the photo-modulation layer, the semiconductor layer having a depletion layer which has a capacitance variable in response to an applied varying electric field, means for applying the varying electric field to the semiconductor layer for varying the capacitance of the depletion layer thus subjecting the electric field generated by the charge latent image being applied to the photo-modulation layer and means for projecting a reading light passing through the photo-modulation layer and for detecting modulation of the reading light passed therethrough.

DETAILED DESCRIPTION OF THE INVENTION

There will be described preferred embodiments of a photo-modulation method and a system for reproducing a charge latent image according to this invention, referring to the accompanying drawings, in detail. Throughout the drawings, like reference numerals and letters are used to designate like or equivalent elements for the sake of simplicity of explanation.

Figure 14:
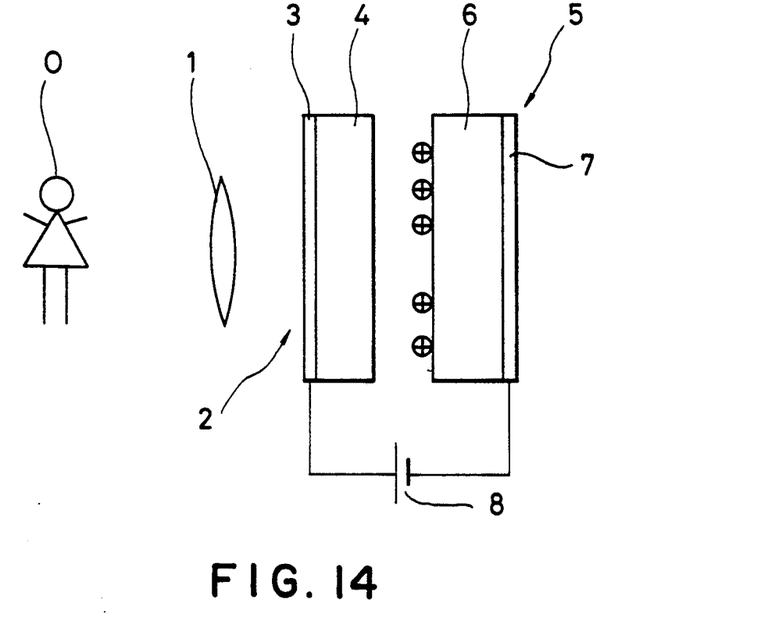
FIG. 14 is a block diagram showing an arrangement of a recording unit for recording the charge latent image in a charge latent image recording medium.

At first, it will be explained how the data signal is recorded in a charge latent image recording medium as a charge latent image with reference to FIG. 14 which is a block diagram showing an arrangement of a recording unit. The recording unit comprises an imaging lens 1 as imaging means for forming an optical image of an imaging object O; a writing head 2 composed by laminating a transparent electrode plate 3 and a photoconductive layer (hereinafter abbreviated in PCLw) member 4; a charge latent image recording medium 5 composed by laminating a charge latent image hold layer (CHL) member 6 and an electrode plate 7; and a power source 8 whose anode and cathode are connected to the plates 3 and 7, respectively.

When the optical image of the object O is projected to the PCLw member 4, the electric resistance of the PCLw 4 varies in response to an intensity distribution of the optical image. The voltage generated between the PCLw 4 and the CHL 6 thus varies in response to the optical image so as to form a charge latent image on the CHL 6 by means of spark discharge caused therebetween. The charge latent image corresponds to the optical image.

The structural and operational principles of the photo-modulation process according to this invention will be described with reference to FIGS. 12 and 13.

In the FIG. 12(a), the charge latent image is already recorded in the recording medium as explained with reference to FIG. 14 and a reproducing head 2A is composed by laminating the transparent electrode plate 3, a dichroic mirror 9 and a photo-modulation layer (PML) member 10.

Since the mirror 9 is arranged close to the CHL 6, the electric field generated by the charge latent image recorded in the CHL 6 is applied to the PML 10 so that the reading light Lr incident through the plate 3 to the reproducing head 2A passes through the PML 10, reaches the mirror 9 to be reflected thereby and again passes through the PML 10 to be emitted from the plate 3.

If the PML 10 is composed of liquid crystal and applied with an alternating electric field, electric flux lines from the charge latent image of the medium 5 are applied to the liquid crystal layer constituting the PML 10 through the mirror 9 to cause the rotary polarization of the light Lr incident through the plate 3 to the reproducing head 2A vary in response to the intensity of the two dimensionally distributed electric field generated by the charge latent image in the medium 5 when the light Lr passes through the liquid crystal layer.

Figure 12A:
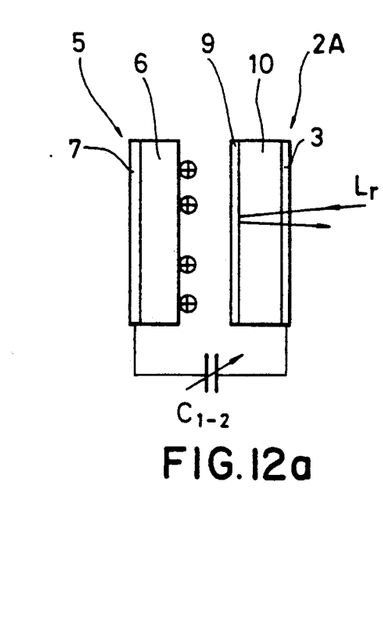
FIGS. 12 and 13 are schematic diagrams for explaining structural and operational principles of the photo-modulation method according to this invention.
Figures 12B, 12C:
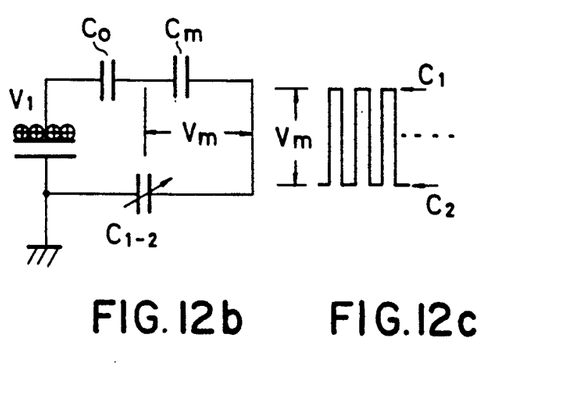

FIG. 12(b) shows the equivalent circuit diagram of the charge latent image reproducing system shown in FIG. 12(a) and composed of $V_1$ which is the voltage of the charge latent image recorded in the CHL 6 (the terminal voltage of the capacity formed in the CHL 6), Co which is the capacity formed in the mirror 9 or a gap, etc. other than the PML 10, Cm which is the capacity formed in the PML 10 and $C_{1-2}$ which is the external capacity variable between the capacitances $C_1$ and $C_2$ and connected to Co and Cm in series.

When $C_{1-2}$ varies between $C_1$ and $C_2$, voltage Vm applied to Cm varies as already known, so that alternating voltage Vm(p—p) shown in FIG. 12(c) is applied to the PML 10. Under this state, the rotary polarization of the light Lr incident through the plate 3 to the reproducing head 2A vary in response to the intensity of the electric field when the light Lr passes through the liquid crystal layer.

Figure 13A:
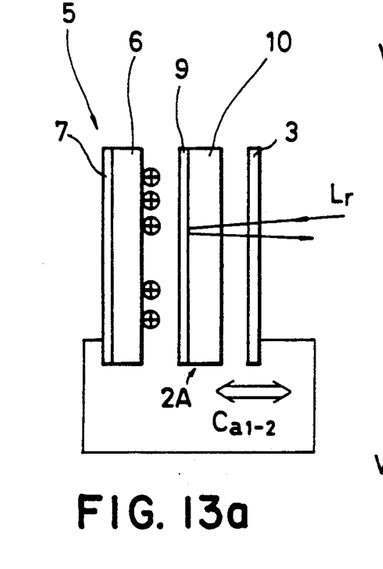

The diagram shown in FIG. 13(a) operates same as that of FIG. 12(a).

Figure 13B:
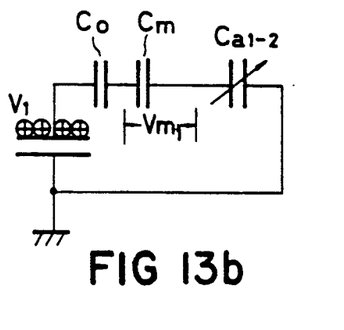

FIGS. 13(b) and (d) are the equivalent circuit diagrams of the charge latent image reproducing system shown in FIG. 13(a) in the case of the higher voltage $V_1$ of the charge latent image recorded in the CHL 6 (the terminal voltage of the capacity formed in the CHL 6) and of the lower voltage $V_2$, respectively where $Ca_{1-2}$ which varies by varying the space between the plate 3 and the PML 10 as indicated by double head arrow in FIG. 13(a) is connected to Co and Cm in series.

Figure 13C:
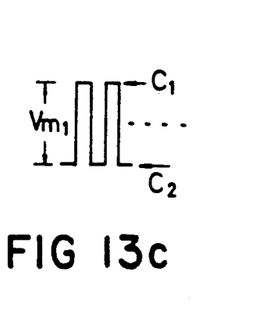
Figure 13D:
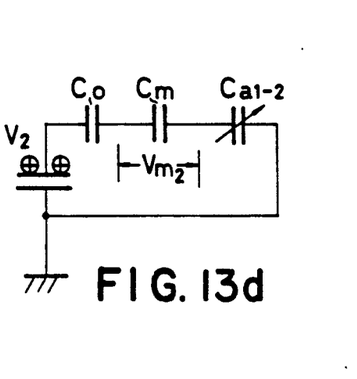
Figure 13E:
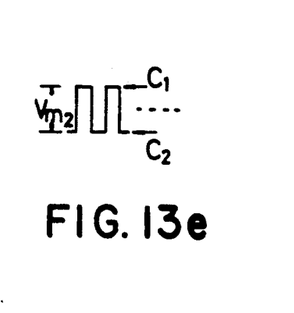

In FIGS. 13(b) and (d), by varying the space between the plate 3 and the PML 10 as indicated by the double head arrow in FIG. 13(a), alternating voltage $Vm_1$(p—p) shown in FIG. 13(c) and $Vm_2$(p—p) shown in FIG. 13(e) are applied to the PML 10, respectively. Under this state, the rotary polarization of the light Lr incident through the plate 3 to the reproducing head 2A varies in response to the intensity of the electric field when the light Lr passes through the liquid crystal layer.

The light emitted out of the reproducing head 2A may be converted to intensity modulated light by passing through an analyzer (not shown).

As is understood with reference to FIGS. 12 and 13, the liquid crystal layer employed as the photo-modulatic,n layer member PML 10 is applied with the alternating voltage when the value of the capacity connected to the PML 10 in series is varied at a predetermined rate in the time domain.

In this invention, the thickness of the depletion layer produced in the semiconductor layer is varied at the predetermined rate in the time domain so as to vary the value of the capacity connected to the PML 10 in series at the predetermined rate. Thus, in the case of employing liquid crystal as the photo-modulation member used in a reproducing head for an optical charge latent image, an alternating electric field is substantially applied to a layer of the liquid crystal so that the head operates preferably.

Further the alternating electric field is applied to the photo-modulation member when a dichroic mirror, the translucent film or the reflection preventing film, etc. is used in the head since the alternating electric field goes through such films, thus resolution is prevented from being degraded even with such films being in the apparatus. Furthermore, in the case that there is a gap between the head and the charge latent image recording medium, the electric field generated by the charge latent image recorded in the recording medium is applied to the head under the state that the electric field is divided in the ratio of the capacities of the gap and the head as explained by being referred to FIG. 11, so that sensitivity of the system is improved.

Figure 1:
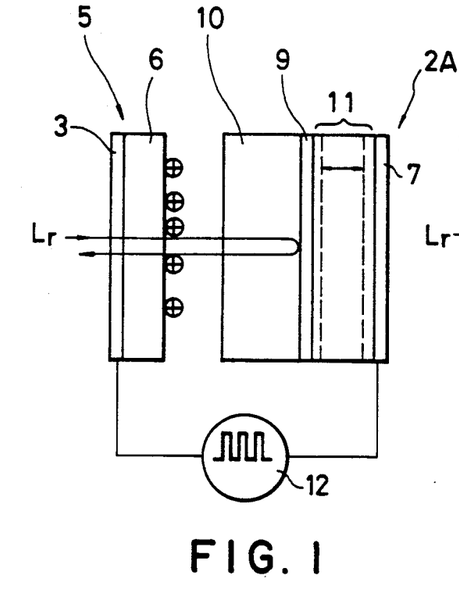
FIGS. 1 to 10 are schematic diagrams showing arrangements of different embodiments of reproducing system capable of reading out the charge latent image according to this invention.

FIG. 1 is a schematic diagram showing an arrangement of a first embodiment of a reproducing system which is applied with photo-modulation system for performing the photo-modulation under the state where the photo-modulation layer member is subjected to the varying electric field by the variation of the depletion layer produced in the semiconductor layer.

In FIG. 1, a reproducing head 2A for a charge latent image is composed by laminating an electrode plate 7, a semiconductor layer member SCL 11 (A silicon substrate with the polarity of P or N type is applicable.), a dichroic mirror 9, and a photo-modulation layer member PML 10 (Any one of the material such as liquid crystal, electrochromic material, single crystal of lithium niobate, BSO, SBN and another photo-modulation member may be used.).

When the liquid crystal is employed as the PML 10, the conventional construction wherein an aligning film and a liquid crystal layer are provided between two transparent substrates, may be employed.

Furthermore, the CHL 6 and the PML 10 are arranged very close to each other and the electric field by the charge latent image recorded in the CHL 6 is applied to the PML 10.

A transparent electrode plate 3 and an electrode plate 7 are applied therebetween with alternating pulses of predetermined amplitude and frequency. When the SCL 11 is a P type semiconductor, the depletion layer is produced when the plate 7 becomes negative, for a N type semiconductor, when the plate 7 is positive.

When the pulse voltage is applied to between the transparent electrode plate 3 and the electrode plate 7, the thickness of the depletion layer in the SCL 11 is varied in response to the pulse voltage. Thus, the space between the electrode plate 7 and the dichroic mirror 9 is varied in effect.

Therefore, when the pulse voltage is applied to between the transparent electrode plate 3 and the electrode plate 7, as already explained with reference to FIG. 13(a), the capacity in the SCL 11 is varied so that the voltage applied to the capacity formed in the PML 10 is varied in response to the pulse voltage. This causes the PML 10 operates alternately. As a result, the electric field by the charge latent image recorded in the CHL 6 is also applied alternately to the PML 10.

When the light Lr is incident through the plate 3, the light Lr passes through the transparent CHL 6 and is incident to the reproducing head 2A. After passing through the PML 10, the light Lr is reflected by the mirror 9 and again passes through the PML 10. Then, the light Lr is emitted from the PML 10 to pass through the CHL 6 and the plate 3 and emitted out of the recording medium 5.

When passing through the liquid crystal layer of the PML 10, the rotary polarization of the light Lr is varied (polar-modulated) in response to the strength of the electric field so that the light Lr emitted from the medium 5 is converted to vary in intensity when it passes through an analyzer (not shown) and may further be detected.

Figure 15:
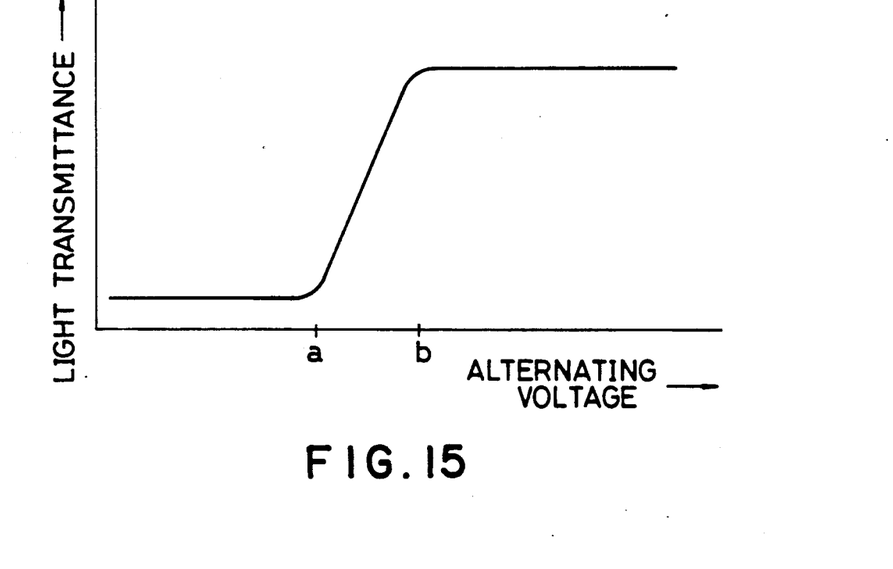
FIG. 15 is an example of the characteristic of light transmittance for explaining the embodiments.

When a liquid crystal is employed as the PML 10, and its modulation characteristic is shown in FIG. 15 in which a variation of the light transmittance is expressed as a function of the alternating voltage applied to the PML 10, the appropriate range for the photo modulation is in the area between a and b of the alternating voltage in the figure.

Therefore, in the first embodiment according to this invention shown in FIG. 1, the pulse voltage applied from the power source 12 to the plates 3 and 5 for varying the thickness of the depletion layer of the SCL 11 is adjusted so as to make the PML 10 preferably perform the modulation operation.

Figure 2:
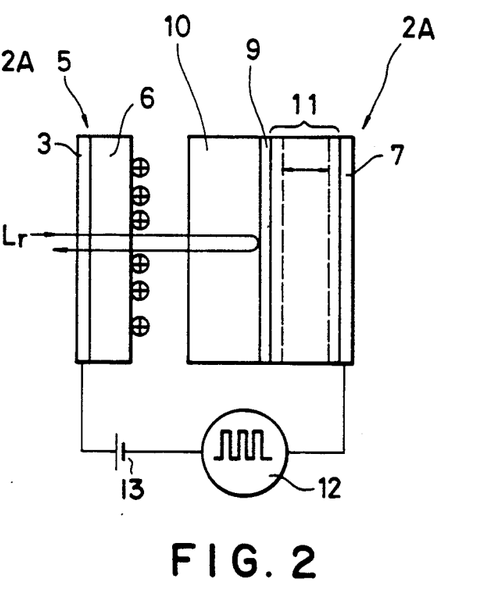

FIG. 2 shows the second embodiment according to this invention. There are provided the power source 12 for applying the pulse voltage to the plates 3 and 7 to vary the thickness of the depletion layer in the SCL 11 and a power source 13 for generating bias voltage to make the PML 10 preferably perform the modulation operation. The power sources 12 and 13 are connected to each other in series.

Figures 3, 4:
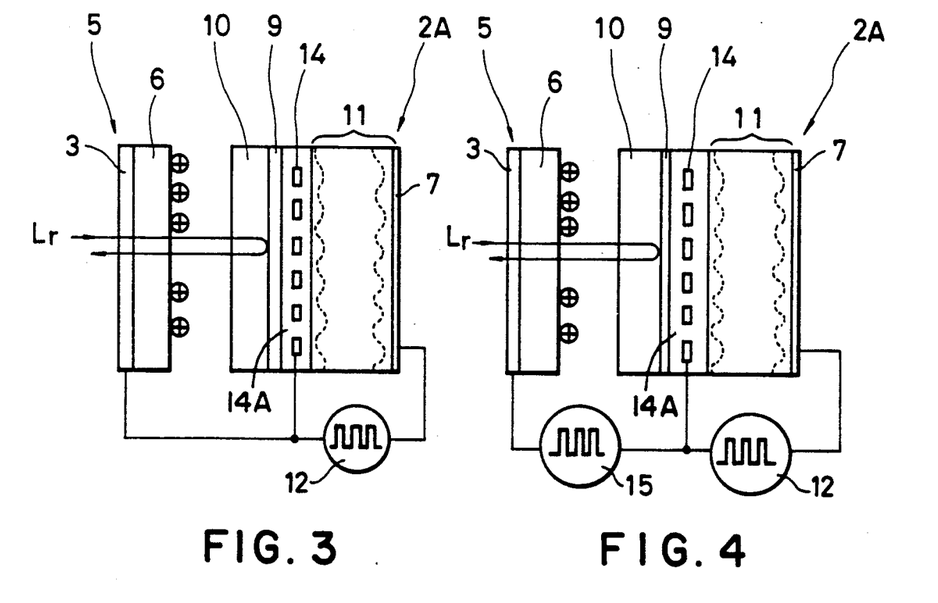

FIG. 3 shows the third embodiment according to this invention. There are provided patterned electrode 14 having a specified pattern and an insulating layer 14A which is sandwiched between the mirror 9 and the SCL 11. The electrode 14 is embedded in the layer 14A. The power source 12 connected to the electrode 14 and the plate 7 applies a pulse voltage to the SCL 11 for varying the thickness of the depletion layer in the SCL 11 so as not to affect the PML 10. The electrode 14 may be composed of many wires or strips of metal aligned in a transverse or longitudinal direction in parallel each other or in any other patterns.

Figure 5:
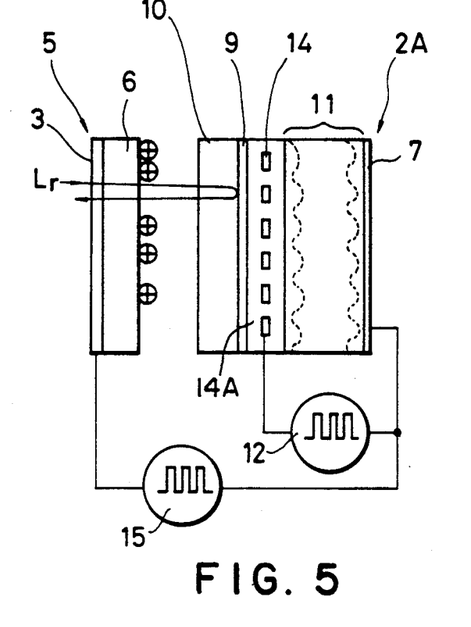
Figure 6:
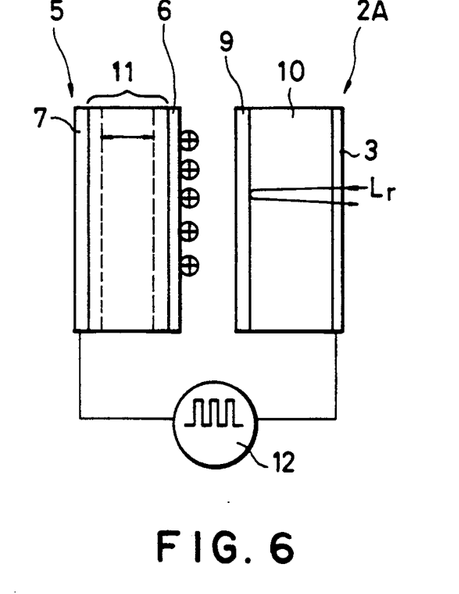
Figure 7:
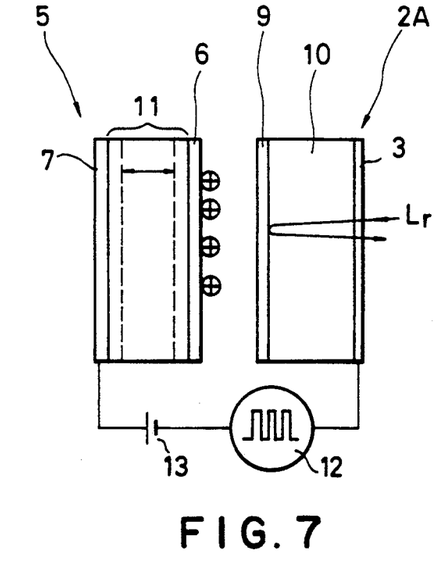

FIGS. 4 and 5 show the fourth and fifth embodiments according to this invention wherein a bias power source 15 for setting the operating point of the PML 10 is provided.

The power source 15 is connected to between the plate 3 and the electrode 14 and between the plates 3 and 7 in FIGS. 4 and 5, respectively.

The embodiments explained with reference to FIGS. 1 to 5 disclose the SCL 11 for varying the thickness of the depletion layer therein in the reproducing head 2A. On the other hand, the embodiments shown in FIGS. 6 to 10 disclose the CHL 11 in the recording medium 5.

The reproducing head 2A shown in FIGS. 6 to 10 is composed by laminating the transparent electrode plate 3, the photo-modulation layer member PML 10 and the dichroic mirror 9 and the read light Lr is incident through the electrode 3.

Figure 8:
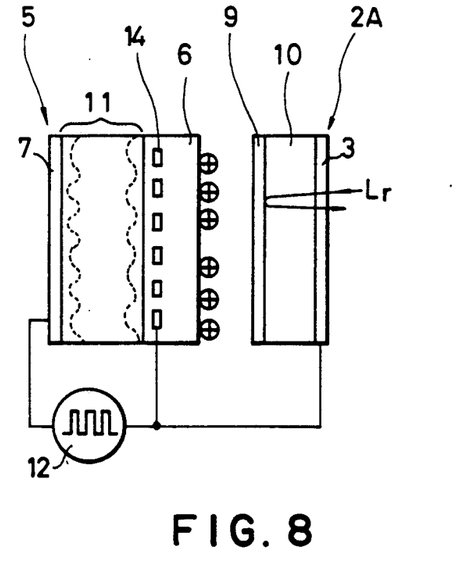
Figure 9:
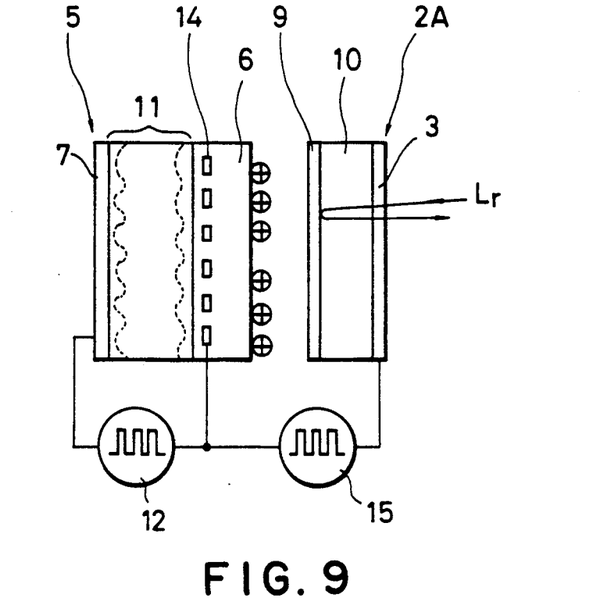
Figure 10:
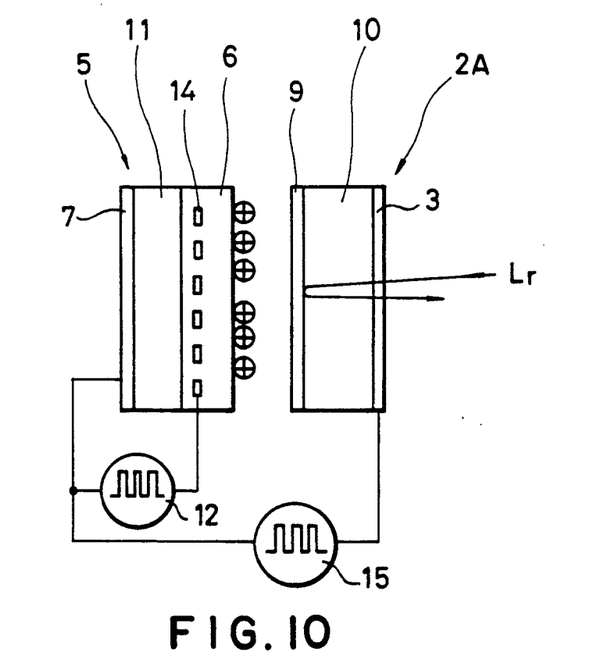

Further, in FIGS. 8 to 10, the patterned electrode 14 is embedded in the CHL 6. Other construction and operation of the embodiments shown in FIGS. 6 to 10 are same as those shown in FIGS. 1 to 5, respectively.

In the embodiments already explained, there is always the electrode plate 7 laminated to a surface of the SCL 11 so as to apply constant voltage thereto. However, the surface of the SCL 11 itself may operate as an electrode plate instead of the additionally laminated plate 7.

Figure 11:
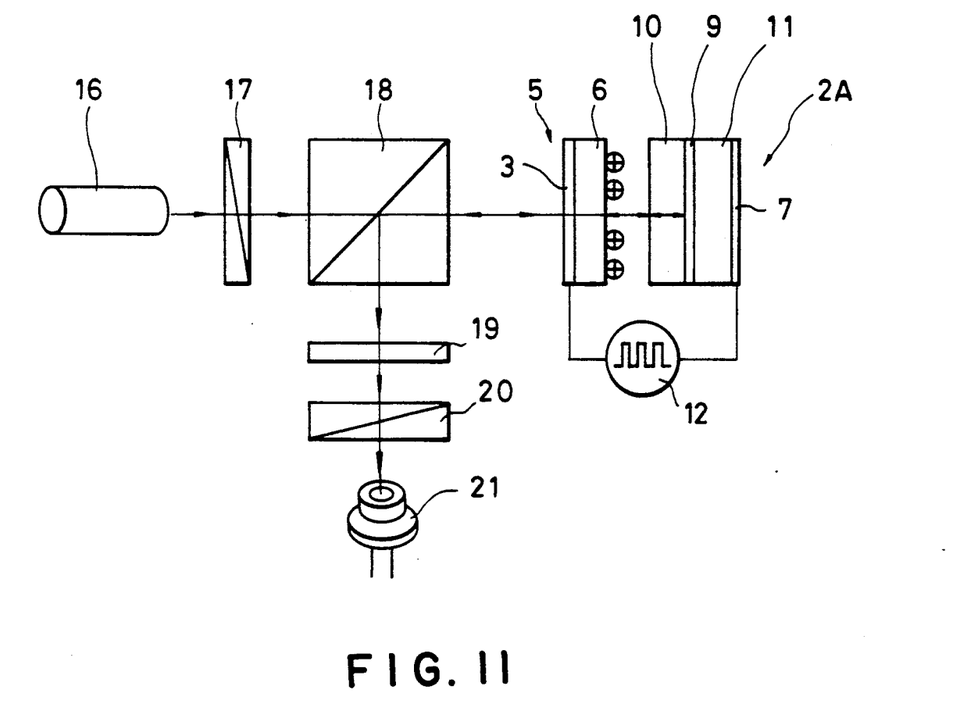
FIG. 11 is a schematic diagram showing an arrangement of an optical system employing the reproducing apparatus according to this invention.

FIG. 11 is a schematic diagram showing an arrangement of a reproducing system employing the reproducing head 2A according to this invention. Further, provided in addition to the reproducing head 2A are a light source 16 such as a laser light source, a polarizer 17, a beam splitter 18, a wave-plate 19, an analyzer 20 and a photoelectric transducer 21.

In FIG. 11, the flux of light irradiated from the light source 16 is changed into linearly polarized rays by the polarizer 17 to pass through the beam splitter 18. Then the rays as a read light are incident to the recording medium 5 through the transparent electrode plate 3. After passing through the transparent CHL 6, the read light is incident to the reproducing head 2 to pass through the PML 10 and reflected by the mirror 9. The light again passes through the PML 10 to be incident to the medium 5. After passing through the CHL 6 and the plate 3, the light is emitted out of the medium 5 to be reflected in the beam splitter 18 and passes through the wave-plate 19 and the analyzer 20 to be photoelectrically detected by the photoelectric transducer 21.

The rotary polarization of the light varies in response to the strength of the electric field applied to the liquid crystal layer of the PML 10 when passing therethrough. The light emitted from the reproducing head 2A is then converted into an intensity modulated light, so that the transducer 21 produces an electric signal corresponding to the amount of the laser spotted point of charge of the charge latent image.

The flux of the read light irradiated by the light source 16 may be deflected by a deflector (not shown) in one dimension or two dimensions to scan the charge latent image. Also, the photoelectric transducer 21 can be replaced with such as a line image sensor or a two dimensional image sensor. Furthermore, the medium 5 and the reproducing head 2A may be relatively displaced each other to scan the charge latent image.

What is claimed is:

1. A method of modulating a photo-modulation layer correspondingly with an electric field applied thereto, comprising the steps of:

applying an alternating electric field to a semiconductor layer disposed adjacent to the photo-modulation layer to vary a thickness of a depletion layer thereof responsive to the alternating electric field; and applying said electric field to the photo-modulation layer while said alternating electric field is applied to said semiconductor layer and varying the thickness of said depletion layer.

2. A system for reproducing a charge latent image recorded in a recording medium which comprises at least a charge hold layer holding said charge latent image, said system comprising:

a photo-modulation layer disposed adjacent to said recording medium so as to be subjected to an electric field generated by said charge latent image held on the charge hold layer;

a semiconductor layer disposed adjacent to said photo-modulation layer, said semiconductor layer having a depletion layer which has a capacitance variable in response to an applied varying electric field;

means for applying said varying electric field to said semiconductor layer for varying said capacitance of the depletion layer thus subjecting said electric field generated by said charge latent image being applied to said photo-modulation layer;

means for projecting a reading light passing through said photo-modulation layer and for detecting modulation of the reading light passed therethrough.

3. A system as set forth in claim 2, further comprising means for applying a bias potential to said photo-modulation layer to set up an operational point thereof.

4. A system as set forth in claim 2, wherein said system further comprises an insulating layer laminated to one side of said semiconductor layer, and wherein said varying electric field applying means comprises a patterned electrode embedded in said insulating layer and an electrode laminated to another side of said semiconductor layer, and a source generating said varying electric field.

5. A system as set forth in claim 4, wherein said source generates alternating pulses of predetermined amplitude and frequency so that said varying electric field varies in response to the generated alternating pulses.

6. A system as set forth in claim 4, further comprising means for applying a bias potential to said photo-modulation layer for setting up an operational point thereof.

7. A system for reproducing a charge latent image, comprising:

a charge latent image recording medium composed of a charge latent image hold layer on which said charge latent image is recorded and a semiconductor layer having a depletion layer laminated to said image hold layer;

a reproducing device disposed adjacent to said recording medium for reproducing said charge latent image and composed of a photo-modulation layer through which a reading light passes and being polar-modulated in response to an electric field generated by said charge latent image;

means for applying an electric field varying in a time domain to said semiconductor layer to vary a capacitance of said depletion layer and applying also to said photo-modulation layer; and means for projecting a reading light passing through said photo-modulation layer and for detecting modulation of the reading light passed therethrough.

8. A system as set forth in claim 7, further comprising means for applying a bias potential to said photo-modulation layer for setting up an operational point thereof.

* * * * *